Sept. 8, 1925.

R. L. SMITH

PNEUMATIC BUMPER FOR VEHICLES

Filed Dec. 1, 1924

Inventor.
Roland L. Smith
by Heard Smith & Tennant
Attys

Patented Sept. 8, 1925.

1,552,965

UNITED STATES PATENT OFFICE.

ROLAND L. SMITH, OF BELMONT, MASSACHUSETTS.

PNEUMATIC BUMPER FOR VEHICLES.

Application filed December 1, 1924. Serial No. 753,115.

*To all whom it may concern:*

Be it known that I, ROLAND L. SMITH, a citizen of the United States, and a resident of Belmont, county of Middlesex, State of Massachusetts, have invented an Improvement in Pneumatic Bumpers for Vehicles, of which the following description, in connection with the accompanying drawing, is a specification, like characters on the drawing representing like parts.

This invention relates to improvements in pneumatic bumpers for vehicles and the object thereof is to provide a bumper which will more effectively cushion the shock of collision than bumpers heretofore produced.

A further object of the invention is to provide a simple and effective bumper construction of neat appearance and which can be readily applied to usual types of automobiles.

A further object of the invention is to provide a pneumatic bumper in which the shock of collision will be absorbed by a series of progressively increasing yielding resistances.

A further object of the invention is to provide a pneumatic bumper comprising a plurality of tubes containing air under pressure arranged in substantially horizontal alinement and in which different degrees of air pressure may be maintained in the different tubes, preferably the front tube which receives the initial shock of collision being less than that of the succeeding tube or tubes.

A further feature of the invention consists in providing resilient means intermediate of the tubes and of the tubes and bumper bar operable separately or in conjunction with the pneumatic pressure in the tubes to cushion the shock of collision.

A further object of the invention is to provide a bumper of the character described in which the tubes can be readily removed and replaced.

Other objects and features of the invention will more fully appear from the following description and the accompanying drawing and will be particularly pointed out in the annexed claims.

A preferred embodiment of the invention is illustrated in the accompanying drawing, in which, Fig. 1 is a plan view of a pneumatic bumper secured to a bumper bar which is attached to the side bars of an automobile frame, portions of which and also portions of the wheels of the automobile being illustrated to show the relative positions of the bumper thereto;

Figure 1:
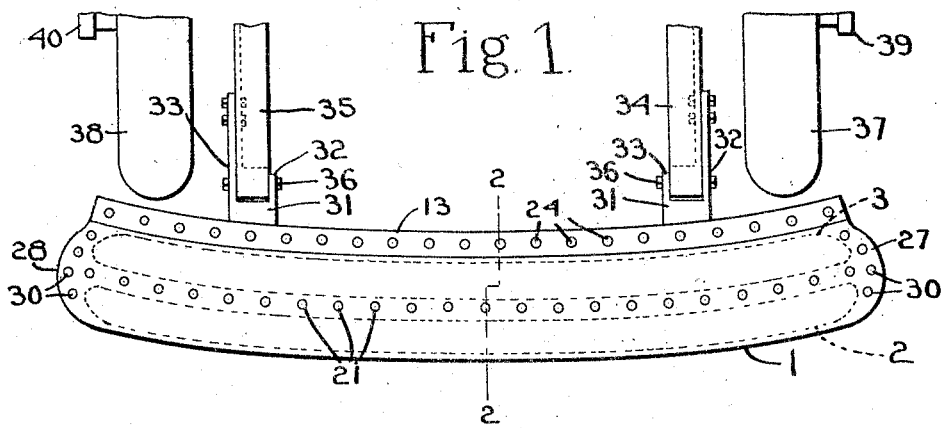
Figure 2:
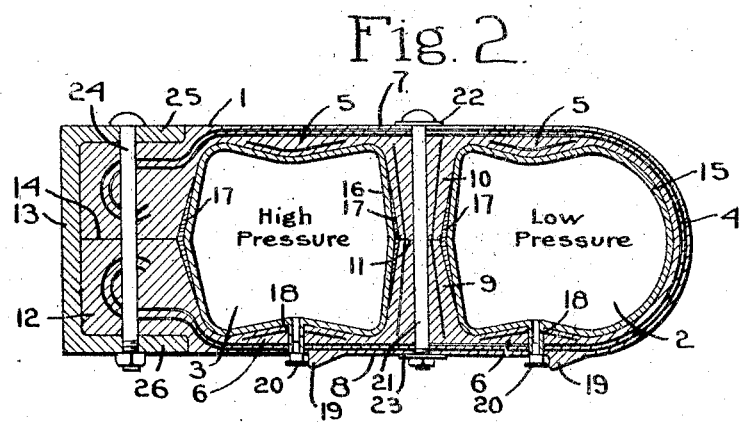
Fig. 2 is a transverse sectional view on line 2—2 Fig. 1.
Figure 3:
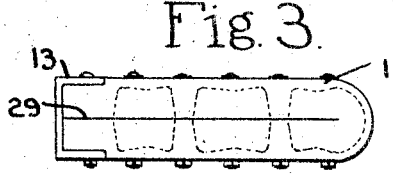
Fig. 3 is an end elevation of the bumper and bumper bar.
Figure 4:
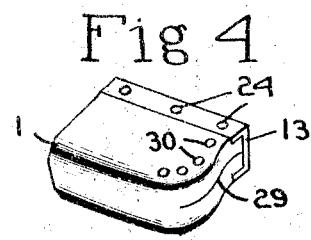
Fig. 4 is a perspective view of an end portion of the bumper and bar showing the divided casing and the means by which the sections thereof are secured together and secured to the bumper bar.

In the construction illustrated in the drawing a pneumatic bumper is shown having two tubes containing air under pressure arranged in substantial parallelism and in substantially a horizontal plane, but it will be understood that any number of tubes may be employed within the scope of the invention as defined by the claims.

In the illustrative embodiment of the invention shown in the drawing the pneumatic bumper comprises a casing 1 of resilient material, which may be of rubber or rubber reinforced with fabric such as is employed in the casings of automobile tires. The casing is provided with a plurality of cavities 2 and 3 preferably in substantial parallelism and also preferably in substantially a horizontal plane when the pneumatic bumper is applied to the vehicle, and it will be understood that the term "a horizontal plane" as used herein to define the invention refers to the position of the tubes in the bumper when applied to the vehicle.

The front wall 4 of the casing desirably is of substantially uniform thickness, while the upper and lower walls 5 and 6 of the cavities 2 and 3 respectively desirably are made progressively thicker toward the median portion of the wall so that when the pneumatic tubes are expanded by air under pressure the upper and lower faces 7 and 8 of the pneumatic bumper will be substantially flat and thereby present a pleasing appearance.

The cavities 2 and 3 of the casing are separated by a relatively thick web of resilient material, such as reinforced rubber, and desirably are made in sections 9 and 10 having preferably a median line 11 of separation. The rear wall 12 of the casing desirably is of much greater thickness than the front wall 4 and is formed to fit the recess of a channel-shaped bumper bar 13 or other supporting device. The rear wall like the web desirably is provided with a median line of separation 14. Thus the line of separation of the rear wall 14 and the line of separation of the web are in substantial alinement so that the sections may be separated to permit the introduction and removal of the pneumatic tubes.

The front pneumatic tube 15 and the rear pneumatic tube 16 are positioned within the cavities, linings 17 desirably being placed upon the faces of the web and the inner face of the rear wall to prevent the tubes containing air under pressure from being forced into the crack between the sections of the web and rear wall and being pinched thereby.

The pneumatic tubes desirably are provided with a usual type of valve stem 18 which may conveniently extend through the lower wall of the cavity and desirably bosses 19 of resilient material are formed integral with the casing in advance of the ends of the stems to prevent stones and other objects from striking and injuring the ends of the valve stems or their caps 20.

The sections of the casing may be secured together in any desirable manner. As illustrated herein the sections of the webs are secured together by a series of bolts 21 spaced apart at convenient intervals and provided with washers 22 and 23 located respectively intermediate of the heads of the bolts and the casing and between the nuts of the bolt and the casing. By securing the sections of the web together by a series of fastening devices the flexibility of the bumper when subjected to shock is not reduced materially.

The sections of the rear wall of the casing preferably are secured together and to the bumper bar by a series of bolts 24 which pass through the upper and lower flanges 25 and 26 of the bumper bar and through the sections of the rear wall of the casing, the flexibility of the flanges 25 and 26 being sufficient to enable the sections of the bumper to be securely clamped therebetween by the bolts when the nuts are set up upon the latter.

The end walls 27 and 28 are likewise thicker than the front wall and are likewise formed in sections by a median line of separation 29, the sections being secured together by a series of bolts 30 having washers like those which secure the sections of the web together.

Any suitable means may be provided for securing the bumper bar or other support for the pneumatic bumper to the vehicle. As illustrated herein a pair of forgings or castings 31 are rigidly secured to the bumper bar and provided with arms 32 and 33 which embrace the sides of the front ends of the side frames 34 and 35 and are secured thereto by two or more bolts 36, or otherwise provided with means for retaining the bumper in horizontal position.

Desirably the bumper bar 13 when secured to the vehicle is located in quite close proximity to the tires of the front wheels 37 and 38 and desirably the ends of the bumper bar project slightly beyond the position of the wheel caps 39 and 40.

Desirably the front tube 15 of the pneumatic bumper is maintained under a lower degree of air pressure than the succeeding tube or tubes 16 so that the front tube will yield readily to a light shock of collision and consequently absorb such light shock without inconvenience to the occupants of the vehicle. Upon heavier shocks the progressive action of the pneumatic tubes will serve progressively to reduce the force of impact without substantial inconvenience to the occupants of the vehicle, while in serious collisions which are so great as to collapse the front and rear tubes the shock will be progressively absorbed first by the action of the pneumatic tube containing the lower air pressure, then by the pneumatic tube containing the higher air pressure, and then finally by the combined action of the resilient material of the front wall, the web and the rear wall of the bumper which are forced together and act as a solid piece of rubber.

A further advantage is obtained in the present bumper over bumpers of previous constructions in that the force of impact is absorbed during the progress of the vehicle through a relatively great distance, thereby more gradually cushioning the shock of impact. Obviously the greater the distance between the front wall and the rear wall of the bumper the more effective will be the gradual and progressive cushioning of the shock.

By providing thickened upper and lower walls for the pneumatic tubes as above described the progressive action is increased as the vertical expansion of the tubes is considerably reduced.

In the construction of the casing it may be found convenient to form the upper and lower walls for the respective tubes slightly concave in order that they will assume a substantially horizontal position when the tubes are in place and under pressure.

It will also be obvious that by reason of the construction herein described any desirable pressure may be maintained in either or both of the tubes so that such pressure may be adjusted to the particular conditions under which the car is being operated.

It will be understood that the embodiment of the invention disclosed herein is of an illustrative character, that a greater number of tubes may be employed, that the arrangement of tubes is not necessarily in parallelism or in exact horizontal alinement, and that various changes in form, construction and arrangement of parts may be made within the spirit and scope of the following claims.

Having thus described the invention, what is claimed as new, and desired to be secured by Letters Patent, is:

1. A pneumatic bumper for vehicles comprising a plurality of tubes having flexible walls containing air under pressure disposed in parallelism and in substantially a horizontal plane.

2. A pneumatic bumper for vehicles comprising a plurality of tubes having flexible walls containing air under pressure disposed in parallelism and in substantially a horizontal plane, the air pressure in one of said tubes being greater than that in another.

3. A pneumatic bumper for vehicles comprising a plurality of tubes having flexible walls containing air under pressure disposed in parallelism and in substantially a horizontal plane, the air pressure in the forward tube which receives the impact of collision being less than that in another.

4. A pneumatic bumper for vehicles comprising a plurality of tubes having flexible walls containing air under pressure disposed in parallelism and in substantially a horizontal plane, a single casing of resilient material enclosing all of said tubes and means for securing said casing to a supporting device.

5. A pneumatic bumper for vehicles comprising a plurality of tubes having flexible walls containing air under pressure disposed in parallelism and in substantially a horizontal plane, a single casing of resilient material presenting substantially flat upper and lower faces and formed to receive and fit said tubes and means for securing said casing to a supporting device.

6. A pneumatic bumper for vehicles comprising a plurality of tubes having flexible walls containing air under pressure disposed in parallelism and in substantially a horizontal plane, a single casing of resilient material provided with cavities to receive and fit said tubes and presenting an integral front wall, a web intermediate of said cavities and a rear wall adapted to be secured to a supporting means and means for permitting introduction and removal of said tubes from said cavities.

7. A pneumatic bumper for vehicles comprising a plurality of tubes substantially in a horizontal plane containing air under pressure and having flexible walls, a casing of resilient material provided with cavities for said tubes and presenting an integral front wall, a web intermediate of said cavities and a relatively thick rear wall, said rear wall and web being divided longitudinally to permit introduction and removal of said tubes and means respectively for clamping the sections of said web and the sections of the rear wall together.

8. A pneumatic bumper for vehicles comprising a plurality of tubes substantially in a horizontal plane containing air under pressure, a casing of resilient material provided with cavities for said tubes and presenting an integral front wall, a web intermediate of said cavities and a relatively thick rear wall, said rear wall and web being divided longitudinally to permit introduction and removal of said tubes, a series of clamping means for securing the sections of the web together and means for securing the sections of the rear wall together and to a bumper bar.

9. A pneumatic bumper for vehicles comprising a plurality of parallel tubes substantially in a horizontal plane containing air under pressure, a casing of resilient material provided with cavities for said tubes having upper and lower walls of varying thickness adapted, when the tubes in said cavities contain air under pressure, to present substantially flat upper and lower faces and presenting a front wall, a web intermediate of said cavities and a rear wall shaped to conform to a bumper bar, said rear wall and web being divided longitudinally to permit introduction and removal of said tubes, means for clamping together the sections of said webs and means for clamping the sections of said rear wall together and to the bumper bar.

10. A pneumatic bumper for vehicles comprising a plurality of parallel tubes substantially in a horizontal plane containing air under pressure, a casing of resilient material provided with cavities for said tubes having upper and lower walls of varying thickness adapted, when the tubes in said cavities contain air under pressure, to present substantially flat upper and lower faces and presenting a front wall, a web intermediate of said cavities and a rear wall shaped to conform to a bumper bar, said rear wall and web being divided longitudinally to permit introduction and removal of said tubes, means including a series of bolts for clamping the sections of said web together, a bumper bar having a channel to receive and fit the rear wall of said bumper and means for securing the sections of said rear wall together and to said bumper bar.

In testimony whereof, I have signed my name to this specification.

ROLAND L. SMITH.